United States Patent [19]

Winter

[11] Patent Number: 4,473,285
[45] Date of Patent: Sep. 25, 1984

[54] AUTOMATIC FOCUSING CAMERA
[75] Inventor: Arthur J. Winter, Encino, Calif.
[73] Assignee: W. Haking Enterprises Limited, Hong Kong, Hong Kong
[21] Appl. No.: 325,337
[22] Filed: Nov. 27, 1981
[51] Int. Cl.³ .......................... G03B 3/00; G03B 13/18
[52] U.S. Cl. ..................................... 354/403; 354/405
[58] Field of Search .................. 354/25, 195, 403, 405
[56] References Cited

U.S. PATENT DOCUMENTS 4,288,152 9/1981 Matsuda ................................. 354/25
4,357,083 11/1982 Johnson et al. ........................ 354/25

*Primary Examiner*—Russell E. Adams
*Attorney, Agent, or Firm*—Russell E. Hattis

[57] ABSTRACT

A camera is provided with flash lamp means, preferably a single flash lamp, useful for both range-determining purposes, for automatic focus control and/or flash lamp light exposure control, and in response to depression of the shutter release control, generates an initial range-determining flash of light and then a film exposure flash of light if flash exposure is desired. Before the shutter is opened, the range-determining flash of light reflected from the object involved is detected by a light sensor feeding the inputs of one or more signal level detectors respectively responsive to different peak levels of the reflected flash lamp light profiles indicating object distances falling within different adjacent range zones by being triggered into a given state. In the automatic focus control form of the invention, the outputs of the signal level detectors are scanned sequentially in the order where the signal level detectors responsive to profiles of objects in the nearest range zone are scanned first. A rotatable lens unit starting from a nearest range focussing position is stopped when the first signal level detector having a triggered condition is scanned, the lens unit then being in a properly focussed position for the corresponding range zone.

15 Claims, 4 Drawing Figures

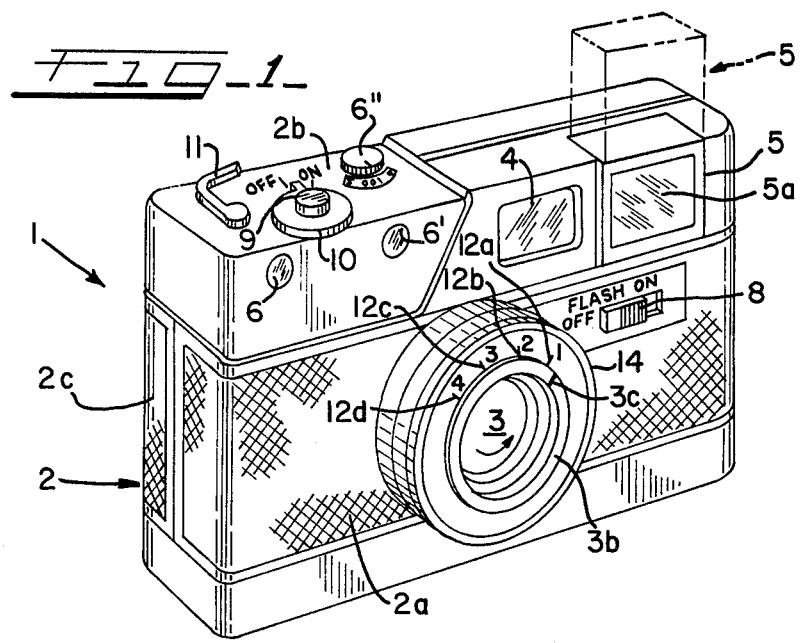
FIG_1_
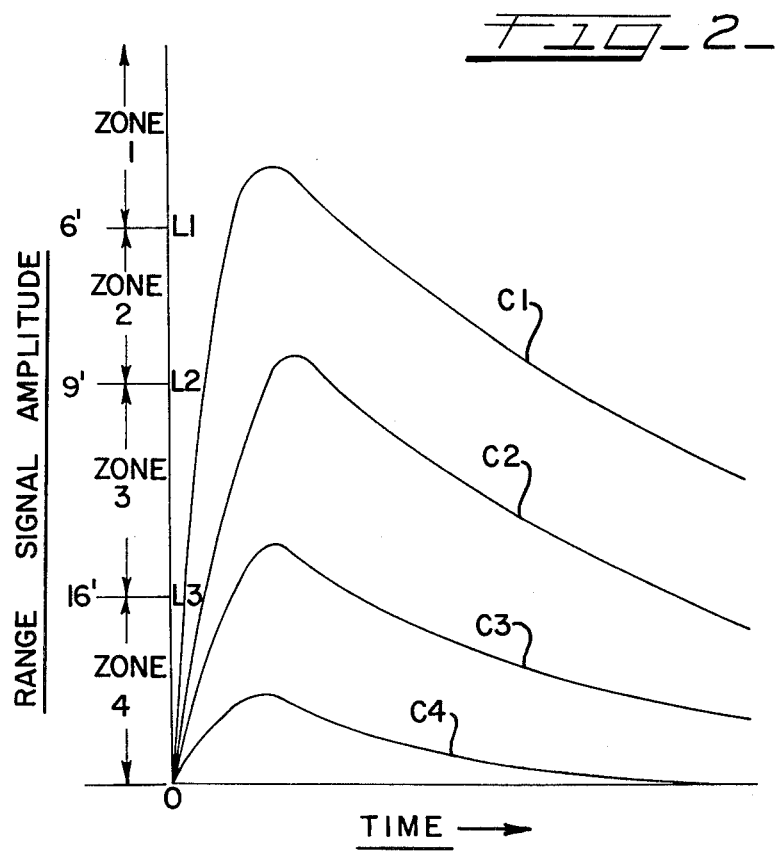
FIG_2_

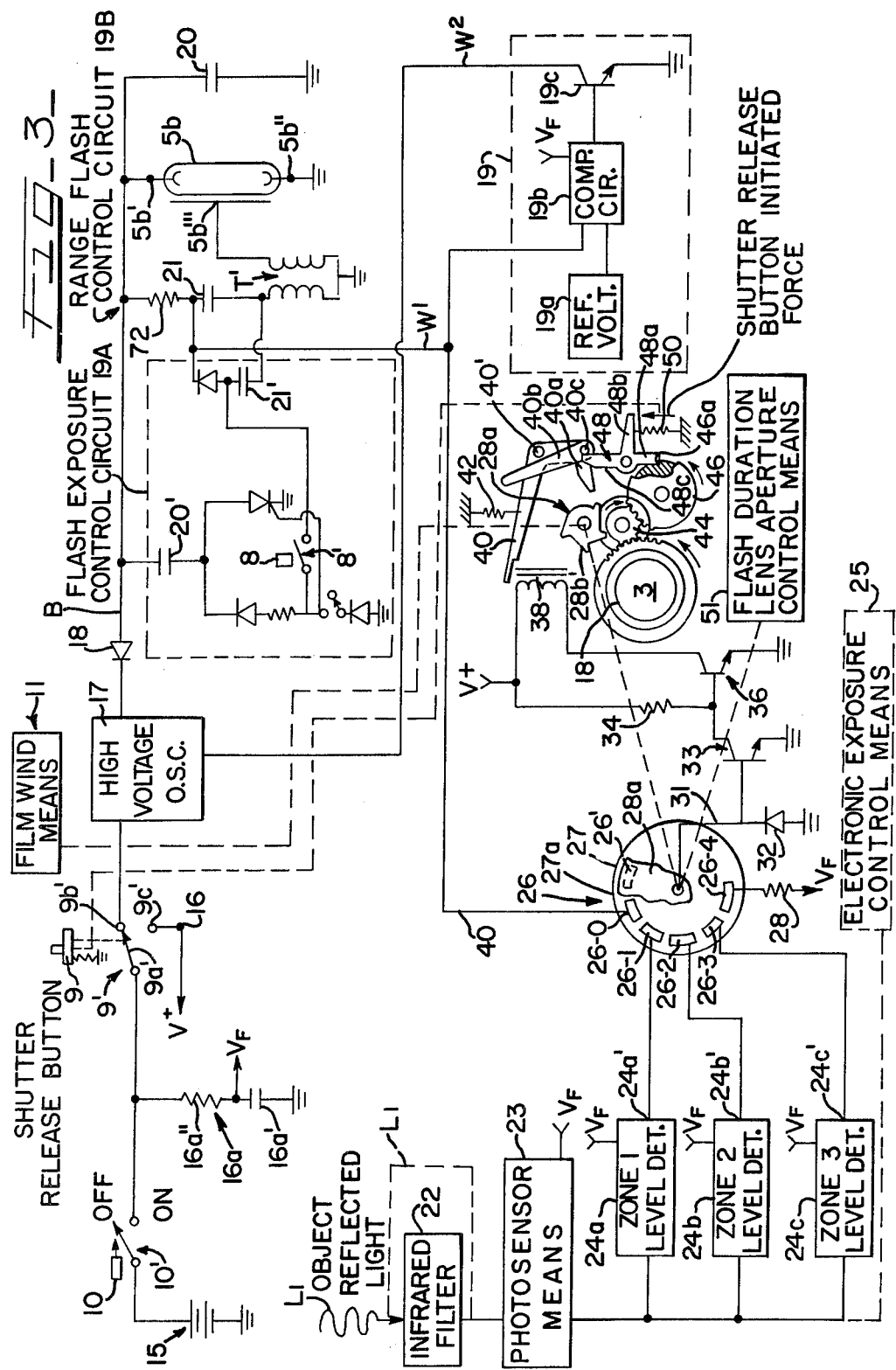

4,473,285

AUTOMATIC FOCUSING CAMERA

BACKGROUND OF THE INVENTION

This invention relates to cameras which utilize the flash lamp associated with a camera to provide information on the distance the object to be photographed is from the camera before a picture is taken with or without flash lamp light enhancement of the object lighting conditions and automatically to adjust the camera focussing means so that the object image is properly focussed in the film plane automatically.

The present invention and the prior automatic focussing art share in common the feature of determining the range of the object to be photographed by generating a first range determining flash of light at all times in response to the depression of the shutter release button of the camera and a later second film exposure flash of light in response to the same depression thereof only if a flash enhanced picture is desired. The shutter opening occurs after a fast acting flash lamp reflected light measuring circuit operates the focussing system in response to the amount of flash lamp light reflected from the object to be photographed. In many prior art systems of this type, separate flash lamps were used to generate these range determining and flash exposure flash operations, and the distance which the object was from the camera was determined by integrating the light energy received from the returned initial flash of light and measuring the length of time it took the integrated measurement to reach a given predetermined value.

U.S. Pat. Nos. 3,681,649 to Uno et al and 4,256,995 to Ishida share in common with the preferred form of the present invention the use of a single flash lamp for providing the range determining and film exposure enhancing light flashes upon a single operation of the shutter release button respectively to produce an energy-saving initial low level energization of the flash lamp and then a high level of energization of the same flash lamp if a flash exposure is called for. The flash circuits disclosed in both of these patents utilize separate capacitors which are discharged through the flash lamp for range information and film exposure purposes, respectively. The main difference between the circuits of these two patents is that, in the circuit of the Ishida patent, for the first flash operation there is placed in series with the flash lamp a parallel circuit comprising an emitter-to-collector path of a constant current regulating transistor in one of the branches thereof and the cathode-to-anode path of an SCR device in the other branch thereof. The base of the current regulating transistor is connected to a constant current-producing control circuit which renders the transistor conductive during the first flash operation where the SCR device is kept non-conductive. During the second flash operation, the SCR device is rendered conductive to bypass the transistor. There is thus a current regulated circuit for the flash lamp only during the first flash operation. In the flash circuit of the Uno patent, there is no regulation over current flow during the first flash operation.

These prior range measuring systems left much to be desired because they were relatively complex and costly and were wasteful of battery power.

The object of the present invention is to provide a more energy efficient and less costly flash light range determining system than those of the prior art.

Some prior art light assisted range determining systems for cameras utilize an infrared light source produced by filtering the visible light from a wide band light source or using a primarily infrared light generating source for range determining purposes because it is believed that infrared light gives more accurate range information when visible light is excluded from the measurement. U.S. Pat. No. 4,221,474 to Lermann and U.S. Pat. No. 1,866,581 to Simjian disclose examples of such infrared range determining systems.

SUMMARY OF THE INVENTION

In accordance with a feature of the invention, the measurement of the range indicating light does not involve any integration operation to save the cost of integrating circuitry and to otherwise simplify the circuitry involved. Rather, only the maximum amplitude of the received preferably infrared light energy profile is measured. Individual signal level detectors are utilized which are set to be triggered by light generated signals which exceed different levels of progressively decreasing magnitude representing the limits of contiguous range zones starting with the closest range zone and ending with the next farthest range zone. Accordingly, a signal generated by a light pulse reflected from an object in the nearest range zone will actuate all of the level detectors involved and a signal generated by a light pulse reflected from an object at a range within the furthest range zone will not operate any of the level detectors. Thus, only n−1 detectors are needed for n range zones. Focussing means respond to the absence of any triggered signal level detector by focussing the camera in the farthest range zone and responds to the triggered signal level detector associated with the nearest range zone to focus the camera for that range zone.

While U.S. Pat. No. 4,240,726 to Wick refers to an automatic focussing system responding to a peak, integral or average value of scene-brightness indicating signals, the camera of this patent does not utilize such peak signals in the same manner as just described, such as in a multi-zone range system. Also, while the U.S. Pat. No. 4,251,144 to Matsuda discloses an automatic focussing system light signal reflected from objects located in different range zones, such a multi-zone system also operates in a completely different manner than that of the present invention, as just described.

In accordance with a preferred specific aspect of this feature of the invention, the focussing means includes a switch having stationary contacts respectively connected to the outputs of the signal level detectors. The contacts are traversed by a wiper moved from an initial position which causes the wiper successively to engage the contacts starting with the contact associated with the signal level detector which is operated by a signal falling within the closest range zone. The last contact to be contacted by the wiper is provided with a permanent signal duplicating the output of a triggered lens detector and is associated with the farthest range zone. Each film winding operation moves and cocks the wiper and the camera lens in a start position, the lens then not yet being in a position to take the closest range picture. Depression of the shutter release button unlocks the wiper and lens so that the wiper will progressively move along with the lens to various positions effecting focussing first in the nearest and then to the farther range zones.

In accordance with a further specific aspect of the invention, a first contact is provided ahead of the first range contact engaged by the wiper and this first contact is utilized as a range flash triggering signal contact which effects discharge of a triggering capacitor in a range flash control circuit for the flash lamp to effect energization of the flash lamp. When the wiper reaches the first of the other contacts having a triggered level detector signal thereon, the further movement of the wiper and the lens is halted by deenergization of a solenoid holding a latch means which drops in the path of movement of a ratchet wheel or the like coupled for movement with the wiper and lens so that the lens is in a position for effecting the proper focussing of the object involved.

In accordance with another basic feature of the invention, to improve circuit reliability and minimize current drain, when operation of the camera is desired, a main on-off switch is provided which when picture taking is desired is moved to an "on" position. This connects a DC battery to a single pole, double-throw switch whose wiper is urged to a contact connected to energize a high voltage oscillator which generates a high voltage which is rectified to produce a high voltage charging voltage for the flash lamp operating capacitors. Then, when the shutter release button is depressed, the last mentioned wiper is moved to another contact to disconnect the power source to the high voltage oscillator (which could otherwise generate false level detector triggering noise voltages). The latter contact is coupled to a filter circuit which produces a filtered DC voltage which energizes the range measurement portion of the circuit.

While many of the above features of the invention have been explained in connection with an automatic focussing camera, many of these features are also useful where the range determining aspects of the invention are used to adjust the shutter opening or the width of the flash lamp light pulse in accordance with the range information to provide, automatically, proper exposure conditions where the flash lamp is the primary source of the light for the picture-taking operation.

The above and other objects, advantages and features of the invention will become apparent upon making reference to the specification and claims to follow.

DESCRIPTION OF THE DRAWINGS

FIG. 1 is a perspective view of a 35 mm camera showing both the conventional controls and the controls operable with the present invention;

FIG. 2 shows the waveforms of the output of the light sensor circuit portion of the circuit of FIG. 3, which circuit responds to object reflected flash lamp light during the range determining mode of operation of the camera, and it illustrates the peak values of the output waveforms which exceed respectively threshold levels L-1, L-2, L-3 of signal level detectors responsive to this output;

FIG. 3 is a partially circuit diagram and a partially box diagram of the electrical portions of the camera, and also includes mechanism operable upon depression of the shutter release button to control the movement of a wiper contact operable in the range determining operation carried out by the present invention.

DESCRIPTION OF EXEMPLARY FORM OF THE INVENTION

Figure 4:
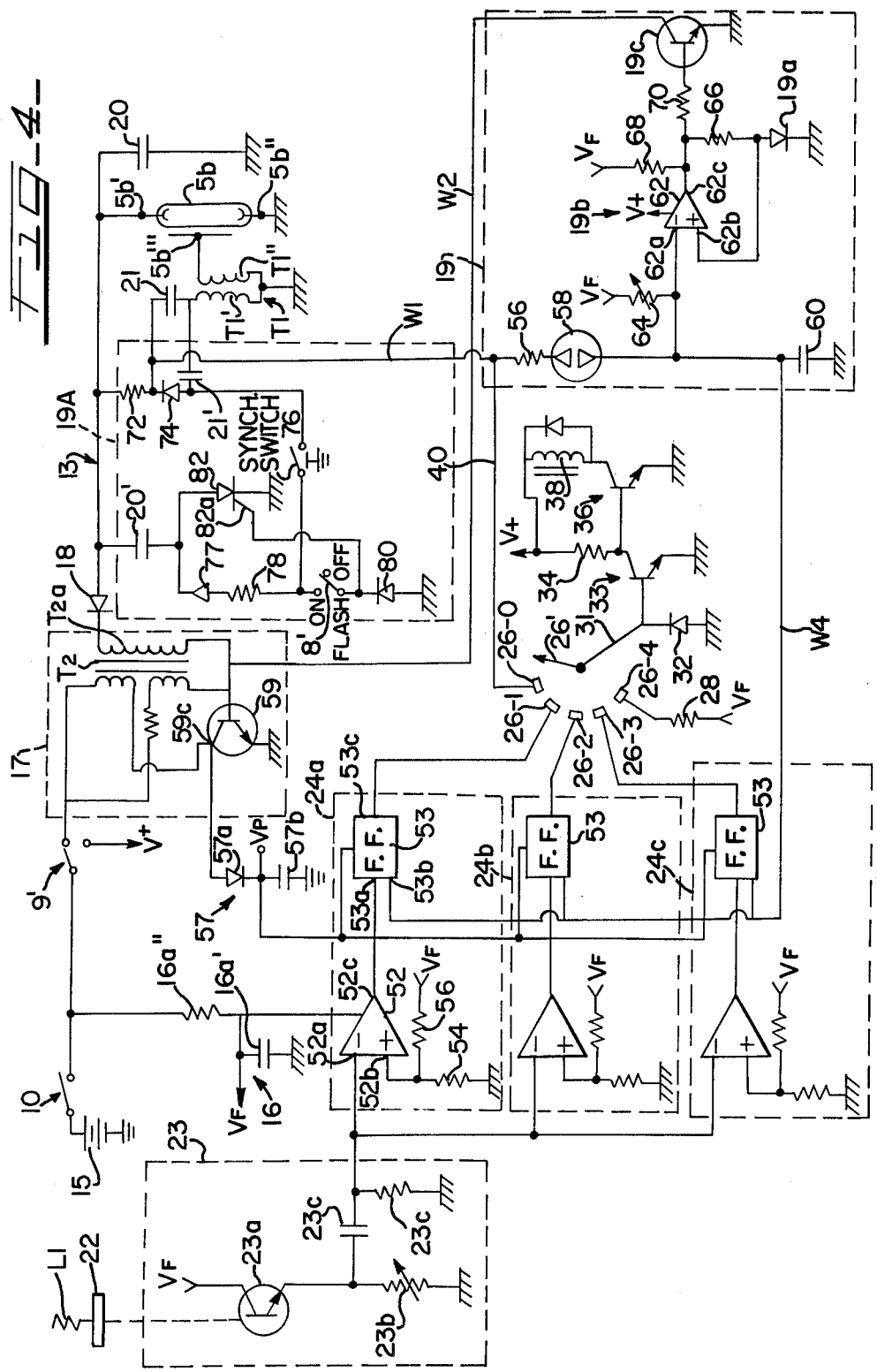
FIG. 4 shows the preferred circuit details which carry out the functions indicated by most of the boxes shown in FIG. 3.

In FIG. 1 there is shown a 35 mm camera 1 having a generally rectangular housing 2, with a front wall 2a including a more or less conventional viewfinder 4 adjacent to a flash unit 5 movable between a locked retracted position shown in solid lines to a spring-urged extended position shown in the dash lines. The flash unit has a window 5a through which the flash lamp light from a flash lamp 5b (FIG. 3) emanates from the flash unit during operation of the invention. The front wall 2a also includes a flash on-off switch 8 which when moved to its "on" position effects the movement of the flash unit 5 from its locked retracted position to its spring-urged extended position.

The front wall 2a also includes a lens unit 3 which is mounted for rotation from an initial cocked position shown in FIG. 1. This lens unit when released for movement will move in a counterclockwise direction as viewed in FIG. 1 and will be stopped in a manner to be described automatically in a position to provide a proper focussing of the object or scene to be photographed.

The front wall of the housing 2 also contains an exposure light-receiving aperture 6' which is in alignment with a light sensor which is an exposure control light sensor for automatically adjusting the speed and/or the aperture of the lens opening to provide a proper ambient light film exposure for the film involved. An ASA film adjustment control 6" is provided to set the speed of the film being used. Obviously, the camera could be provided with manually adjustable shutter time and stop aperture controls (not shown) as provided in most 35 mm cameras. In a modified embodiment of the invention, only a single light-receiving aperture 6 or 6' may be provided where a common light sensor is used for both exposure control and range determination purposes. However, in such an embodiment of the invention, one feature of the invention would not be utilized, namely the use of an infrared filter in front of the light sensor which filters out most of the flash lamp reflected light, leaving mostly infrared light which gives the most accurate range determining information, since proper automatic exposure control should respond to all light reaching the sensor where ordinary film is used responsive to such light. Also, this same information could also be used automatically to control the lens opening or the duration of the flash lamp pulse of light utilized for proper film exposure for the flash lamp exposure mode of operation of the camera.

The top wall 2b of the camera housing also has a film advance lever 11 which, when reciprocated after the taking of a picture, advances the film one frame distance and cocks the shutter. In the present invention, the film winding lever 11 also moves the position of the lens unit 3 to a reference position where the lens unit 3 is in its nearest possible focussing position, although camera focussing does not take place in this position of the lens unit.

The top wall 2b of the camera has a depressable shutter release button 9 which, when depressed, carries out first the low level energization of the flash lamp 5b for range determining purposes. The flash of light resulting from this energization of the lamp strikes the object to be photographed and is reflected back towards the camera and enters the aperture 6 where a range measurement is made in the manner to be described. In the short interval of time before the shutter moves to a position to expose the film, the reflected flash lamp light is measured, the lens unit 3 is released from its cocked position where it is spring driven in a direction which will cause the lens to become focussed on objects located progressively increasing distances from the camera. Depending upon the peak amplitude of the light which is detected by the light sensor associated with the aperture 6, the lens unit 3 will be stopped in a position where it properly focusses an object to any location within the range zone involved. In other words, the range zones are sufficiently narrow that an object spaced from the camera any distance within the zone involved is satisfactorily focussed in the film plane. In the exemplary form of the invention being described, the lens unit 3 can be stopped in any one of four different positions where an index mark 3c on the ring 3b of the lens unit is opposite one of four index marks 12a, 12b, 12c or 12d on a bezel 14 on the front of the camera housing. These range zone index marks identified by reference numerals "1", "2", "3", and "4" identify respectively the range zone Nos. 1, 2, 3 and 4 which are progressively increasing distances from the camera.

After the range measurement is made, if the flash on-off switch 8 had been previously adjusted to its "on" position, the flash lamp is energized automatically a second time as the shutter moves to a lens opening position in response to the same depression of the shutter release button 9 that energized the flash lamp for range determining purposes.

The top wall 2b of the camera housing also has an on-off control 10 which must be placed in an "on" position for the camera circuits to be energized for range determining and flash operation purposes. The camera housing 2 also has a rear door 2c which is hinged to be moved between a housing closing, film covering position and a housing opening position, permitting a roll of film to be placed in the camera and threaded into the sprockets thereof or removed therefrom, as in the case of a conventional 35 mm camera.

As previously indicated in the introductory part of the specification, the range determining operation used in the present invention differs from that used in the prior art which normally operates on integration of the received flash lamp light pulse in that it operates by detecting the peak value of the flash lamp light profile detected by the sensor associated with the aperture. Refer now to FIG. 2 which shows four flash voltage or current verses time waveforms C1, C2, C3 and C4 of the output of the light sensor circuit for flash lamp light pulse profiles reflected from objects located respectively within range zones Nos. 1, 2, 3 and 4 which progressively increase in distance from the camera. These range zones are shown respectively with their highest range zone positions being respectively 6 feet, 9 feet, fifteen feet and infinity. Any light sensor output flash lamp profiles measurement for which have peak values indicating flash lamp light reflecting objects spaced from the camera distances falling within the respective range zone Nos. 1, 2, 3 and 4 effect the positioning of the lens unit 3 so that the lens unit index mark 3c respectively falls opposite the index marks 12a, 12b, 12c and 12d, respectively, substantially to focus the object image on the film plane for objects within the four range zones involved. Obviously, one can increase the number of range zones for which the lens unit 3 can be adjusted, but it has been determined that four range zones give good image definition for most camera taking situations.

Refer now to FIG. 3 which illustrates with some circuitry, functional blocks and mechanical apparatus the various features of the present invention. As there shown, a battery 15 is provided having its negative terminal grounded and its positive terminal coupled through an on-off switch 10' which is operated by the on-off control 10 on the camera housing. When the control 10 is moved to the "on" position, the positive terminal of the battery 15 is coupled to a filter circuit 16a comprising a capacitor 16a' and a resistor 16a''. At the juncture between resistor "16a" and capacitor 16a' is a Vf (filtered plus DC voltage) terminal which energizes most of the circuits shown in FIG. 3, except the flash lamp control circuits. The closure of switch 10' also feeds the battery voltage to a wiper 9a' of a switch 9' operated by the shutter release button 9. Initially the wiper 9a' contacts a stationary contact 9b' which is coupled to a high voltage oscillator 17 to energize the same. The output of the high voltage oscillator 17 is coupled through a rectifier 18 to a negative bus B extending to various branch circuits to be described, one of which includes a flash lamp 5b which has terminal, 5b' connected to the output bus B and a terminal, 5b' connected to ground. A relatively small capacitor 20 is coupled between the flash lamp terminal 5b' and ground. The ungrounded plate of capacitor 20 is charged to a negative voltage with respect to ground through the rectifier 18. A triggering capacitor 21 is also charged through the rectifier 18. The capacitors 20 and 21 are in a range flash control circuit generally indicated by reference 19B which is to be described in detail hereinafter, which establishes a low level energization of the flash lamp during an initial time interval after operation of the shutter release button 9. Some of the branch circuits between the bus B and ground include a relatively large capacitor 20' and a triggering capacitor 21 in a flash exposure control circuit 19A which capacitors are operable when a high level flash is desired to energize the flash lamp 5b to produce a substantial film exposing flash of light. The exposure flash lamp control circuit 19A will be described later on in this specification. As soon as these capacitors become adequately charged, the operation of the high voltage oscillator 17 is terminated by a circuit generally indicated by reference numeral 19 which will be hereinafter described. The circuit 19 includes a reference voltage source 19a and a comparison circuit 19b having one input connected to the reference voltage source 19a and another input coupled to the junction of the trigger capacitor 21 and a resistor 72 connected to negative bus B. The output of the comparison circuit 19b is coupled to the base of a control transistor 19c whose emitter is grounded and whose collector is coupled through a conductor W2 to one of the terminals of the high voltage oscillator 17. Normally, the transistor 19c is non-conductive tive so that the high voltage oscillator 17 is in an operable condition. However, when the comparison circuit 19b indicates that the trigger capacitor 21 is adequately charged, the comparison circuit 19b feed a voltage to the transistor 19c which renders the same conductive to terminate operation of the oscillator 17.

When shutter release button 9 is depressed, wiper 9a' makes contact with a stationary contact 9c' connected to a V+ terminal which energizes only a solenoid control circuit to be described.

As previously indicated, during a single depression of shutter release button 9, the flash lamp 5b is initially energized to a relatively low degree for range determining purposes and is then, when a flash operation is desired as indicated by the movement of the flash on-off switch to its "on" position, energized to a much greater degree so that a high energy flash of light is provided for film exposure enhancement purposes. When the shutter release button 9 is released, the wiper 9a' returns to its contact position 9b' thereby de-energizing the range determining circuits soon to be described.

As previously indicated, after a film winding operation has been completed by operating the film winding lever 11 to cock the shutter, the lens unit 3 is also rotated and cocked in a position shown in FIG. 3 where the lens unit is in a position where, when it is released for a movement in a forward direction, it will move first into a position where the object image will be in focus in the film plane for an object within the nearest range zone No. 1. The mechanism for cocking the lens unit 3 and for driving the same and then stopping the same in a proper range zone position is shown in FIG. 3 and will now be described. This mechanism includes a spring loaded drive gear 44, which, when permitted to do so, will rotate under spring pressure in a clockwise direction as viewed in FIG. 3. This gear is held against rotation under this spring pressure by a cocking gear 46 which has a recess providing a shoulder 46a against which a latch arm 48a of a release lever 48 bears, to hold the same in a cocked position until the shutter release button 9 is depressed. When this release button is depressed, an arm 48b of the lever 48 is pushed upwardly as viewed in FIG. 3, to rotate the release lever in a counterclockwise direction to release the cocking gear 46 for rotation under the force of the spring pressure applied to the spring loaded drive gear 44. A spring 50 normally urges the release lever 48 in a direction so that an upper arm 48c thereof abuts against a pin 40c on a lever 40 which urges a pawl 40a of the lever 40 out of the path of movement of one of the teeth 28b' of a wiper and cam gear 28a. The drive gear 44 meshes with a gear (not shown) forming part of the wiper and cam gear 28 so as to rotate the same in a counterclockwise direction when the drive gear 44 is free to rotate, when the shutter release button 9 is depressed and the pawl 40a does not engage one of the teeth 28b' of the wiper and cam gear 28a.

A spring 42 urges the lever 40 in a direction where the pawl 40a will engage one of the teeth 28b', but is prevented from doing so initially by the arm 48c of the release lever 48. When the shutter release button 9 is initially depressed and the release lever 48 is pivoted to release the drive gear 44 as described, the cocking gear 46, wiper and cam gear 28a and lens unit 3 are driven thereby.

A solenoid 38 is provided which is initially energized in an initial interval following depression of the pushbutton 9. When solenoid 38 is energized, the lever 40 is retained by the energized solenoid in its position where the pawl 40a thereof is still out of the path of movement of the teeth 28b' of the wiper and cam gear 28a. The pawl 40a is free to move to a position where it will lock the wiper and cam gear 28a against further rotation when the solenoid 38 becomes de-energized. The circuit for effecting the de-energization of the solenoid 38 will now be described. This circuit is under control of the light reflected from the object to be photographed when a range flash lamp pulse is generated by the flash lamp 5b during this initial in the initial interval after the shutter release button 9 is in operation.

As previously indicated, in the most preferred form of the invention the flash lamp object reflected light L1 which enters the aperture 6 on the front wall 2a of the camera is passed through a filter 22 to strike the light sensor portion of a light sensor circuit 23. The filter 22 filters out substantially most of the light wavelengths except the infrared wavelengths which give a more accurate range measurement. The light sensor generates a voltage or current in the light sensor circuit in proportion to the instantaneous variations of the light energy which strikes the light sensor.

The dashed line L1 in FIG. 3 illustrates a modification involving the removal of the infrared filter 22 so that the incoming light will directly strike the light sensor. The filter 22 is removed only when the sensor is to serve the double function of generating a signal used for range determining purposes and to operate an electronic exposure control means 25 which adjusts the shutter speed or lens opening in accordance with the amount of ambient light received by the sensor.

Whether or not there is an electronic exposure means 25, the range measuring operation is effected by a number of signal level detectors 24A, 24B and 24C, there being $n-1$ number of such signal level detectors (n being the number of range zones provided in the range measuring operation). In the exemplary form of the operation being described, there are four range zones which require only three signals level detectors 24A, 24B and 24C. Exemplary circuits for the signal level detector are shown in FIG. 4 and will be described later on in the specification. The signal level detectors 24A, 24B and 24C are respectively triggered into an active state by signals exceeding progressively decreasing threshold levels of the signals produced in the light sensor circuit 23. Thus, the signal level detector 24A is set to trigger when a relatively large flash light pulse profile like C1 in FIG. 2 exceeds a level L1 representing a maximum object distance of six feet. Similarly, the signal level detectors 24B and 24C are respectively set to be triggered by peak flash lamp light profile signals exceeding signal levels L2 and L3 representing maximum object distances of 9 and 15 feet. For a flash lamp light pulse profile C4 whose peak value does not reach the triggering level of the signal level detector 24C, none of the signal level detectors would be activated. It is thus apparent that the number of activated signal level detectors determines what particular range zone the object distance involved falls. Because of the particular circuitry illustrated in FIG. 3, the activated signal level detectors produce a positive voltage at their output terminal 24a', 24b' or 24c', whereas an unactivated signal level detector will produce a zero or ground voltage. The outputs of the signal level detectors 24A, 24B and 24C are respectively connected to conductive segments 26-1, 26-2 and 26-3 respectively of a switch 26. The conductive segments may be conductive deposits on a stationary insulation disc 27 over which passes the wiper contact 26' of wiper and cam gear 28a forming part of a rotatable mechanism assembly to be described. The wiper contact 26' when released from a cocked position thereof moves in a counterclockwise direction as viewed in FIG. 3 to make successive contact first with a range flash trigger initiating conductor segment 26-0, after which the wiper contact 26' contacts the conductor segments 26-1, 26-2, 26-3, 26-4 in succession if the wiper is permitted to rotate its full distance. A last conductor segment 26-4 is coupled through a resistor 28 to the Vf terminal. The wiper contact 26' is electrically coupled by a conductor 31 to the cathode of a rectifier 32 whose anode is grounded. Any positive voltage on the wiper contact 26' will be coupled to the base of a normally non-conductive NPN transistor 33 to render the same conductive. The emitter of transistor 33 is grounded and the collector thereof is coupled through a resistor 34 to the V+ terminal. The collector of the transistor 33 is connected to the base of an NPN transistor 36 initially rendered conductive when shutter release button 9 is depressed. The transistor 36 has a grounded emitter and a collector coupled through the coil of solenoid 38 to the V+ terminal, the solenoid being energized when transistor 36 is conductive.

When the wiper and cam gear 28a is rotated by the spring loaded drive gear 44 upon initial depression of the shutter release button 9, the wiper contact 26' carried thereby is advanced in a direction where it makes contact initially with the contact segment 26-0 which is connected by a conductor 40 and conductor W1 to the trigger capacitor 21 to discharge the same through the wiper contact 26', the ground connected rectifier 32 oriented to pass a negative voltage to ground and the primary winding of a trigger transformer T1 whose secondary winding is connected to the trigger terminal 5b''' of the flash lamp 5b. The capacitor 20 then discharges through the flash lamp 5b and generates a relative low level light pulse which is reflected from the object to be photographed into the aperture 6.

After the wiper contact 26' contacts the first conductive segment 26-0, it continues to move in a counter-clockwise direction where it makes contact with the first contact segment 26-1. Normally the transistor 36, which is an NPN transistor, is rendered conductive by the connection of its base through the resistor 34 to the V+ voltage terminal. When the base of transistor 36 is grounded, it will become non-conductive to de-energize the solenoid 38, which then enables the spring 42 to pull the lever 40 into a position where the locking pawl 40a thereof moves into the path of movement of one of the teeth 28b' of the wiper and cam gear 28a to stop the rotation thereof. The base of transistor 36 is grounded when the transistor 33 is rendered conductive, which occurs only when the wiper contact 26' contacts a contact segment 26-1, 26-2, 26-3 or 26-4 which is positive. If the object to be photographed is in the nearest range zone, then the signal level detector 24A will be triggered into a condition where its output is positive, to render the associated contact segment 26-1 positive, to effect stopping of the movement of the wiper contact 26' when it reaches this contact segment. However, if the object is in the other range zones, the wiper contact 26' will not contact a conductor segment which is positive until it reaches the contact segment associated with a triggered signal level detector associated with the range zone involved. If none of the signal detectors are triggered, then the wiper contact 26' will be stopped at contact segment 26-4 which is coupled through resistor 28 to the Vf terminal, so that the solenoid 38 will become de-energized when the wiper contact 26' reaches the contact segment 26-4, indicating that the object is located in the farthest possible range zone No. 4.

It has thus been explained how the lens unit 3 is moved to a position for focussing an object in the film plane. After the uncocked lens unit 3 has been rotated to this position, which takes only a small fraction of a second, the timing of the camera apparatus described is such that the same shutter release button depression which enabled the lens unit to be moved to a proper object focussing position effects the operation of the shutter to a position where it exposes the film to the ambient or flash lamp light condition involved to complete a picture-taking operation. When the film winding lever 11 is then operated, the shutter is cocked and the cocking gear 46 is rotated into a position where the latch arm 48a once again falls into the indentation in the cocking gear to engage the shoulder 46a thereof. The release lever 48 is then in a position where the arm 48c thereof has pivoted the solenoid lever 40 into a position where the latching pawl 40a is out of the path of movement of the teeth 28b' of the wiper and cam gear 28a so that the mechanism is in a position to start a new range determining operation, as described.

In accordance with another application of the invention, the wiper position can also be used to control flash duration or lens aperture during a flash exposure operation of the camera. Flash exposure operation of the camera generally requires an adjustment of lens aperture for proper exposure when only flash light illumination of the object to be photographed is utilized. Accordingly, FIG. 3 shows a flash duration or lens aperture control means 51 which is connected by a dashed line to the shaft of the wiper and cam gear 28a indicating the coupling of the latter member to mechanism which controls one of these two parameters.

Reference should now be made to FIG. 4 which illustrates preferred circuitry for carrying out the functions of most of the boxes shown in FIG. 3. Thus, the light sensor means 23 is shown as including a phototransistor 23a having its emitter connected through a variable resistor 23b to ground and its collector coupled to the plus Vf DC supply terminal. The juncture between resistor 23b and the emitter of photo-transistor 23a is coupled through a capacitor 23c, which filters out any effect of ambient light conditions. The capacitor 23c is connected to ground through a resistor 23d and the ungrounded end of this resistor is coupled to the input 52a of an operational amplifier comparator 52 in each of the signal level detector circuits 24A, 24B, and 24C. Since each of these signal level detector circuits is identical except for the particular input signal level to which it is adjusted to be triggered, only one of these signal level detectors will be described, it being understood that the other detector circuits have substantial identical circuitry. Each of the operational amplifier comparator circuits 52 of the signal level detector circuits 24A, 24B, and 24C thus has an inverting (−) input 52a coupled to the output of the sensor circuit capacitor 23c, and a non-inverting (+) input 52b connected through a resistor 54 to ground and through a resistor 56 to the plus Vf DC supply terminal. The resistors 54 and 56 form a voltage-dividing circuit which is different for each of these signal level detectors, so that the voltage on each non-inverting input terminal 52b will be equal to the peak value of the flash lamp light signal profile fed to the inverting input terminal 52a which represents the upper range limit of the range zone with which it is associated. The output terminal 52c of each operational amplifier comparator circuit 52 is connected by a resistor 57 to the Vf terminal of the DC power supply. When the magnitude of the voltage on the inverting input 52a of any comparator circuit 52 exceeds the magnitude of the voltage of the non-inverting input 52b, the voltage at the output 52c of the comparator circuit 52 will switch from its initial positive voltage to ground, which will effect the setting of an associated flip-flop circuit 53 whose set input terminal 53a is coupled to the output 52c of the associated comparator circuit 52. The flip-flop circuit 53 associated with each of the comparator circuits 52 have a reset input 53b which is reset at the termination of each range determining flash operation. This reset circuit will be described shortly. When a flip-flop circuit 53 is in its set state, the output 53c thereof will be positive, and, when a flip-flop circuit is in a reset state, the output 53c thereof will be at ground potential. (The manner in which the wiper 26' is stopped at a particular contact segment in response to a positive output to terminate the movement of the lens unit 3 after release from its starting position following the depression of the shutter release button 9 has already been described.)

In the commercial form of the circuit involved, when the battery 15 was a 3 volt batter, the flip-flop circuits 53 operated marginally because of the low battery voltage. To avoid this problem, a large useful DC voltage was obtained from the high voltage oscillator 17 at a point thereof where a relatively low but a higher than 3 volt voltage was available. To this end, a DC supply circuit 57 was formed by a rectifier 57a coupled between the collector 59c of the high voltage oscillator transistor 59 and one terminal of a capacitor 57b whose other terminal is grounded. The Vp juncture between the capacitor 57b and rectifier 57a provides an adequate plus voltage for energizing the flip-flop circuits 53 when the shutter release control 9 is depressed, the capacitor 57b retaining the desired DC voltage in the intervals when the high voltage oscillator is not operating.

The high voltage oscillator 17, which is initially energized when the power on-off switch 10' is in its "on" position, may be any well known oscillator circuit. As illustrated, it has an output transformer T2 with a secondary winding T2a in which is induced a high frequency high voltage alternating voltage. One end of the secondary winding T2a is coupled to the rectifier 18 previously described, in turn, connected to the bus B, and the other end of the secondary winding T2a is coupled by conductor W2 to the collector of transistor 19c previously described, which is normally non-conductive but is rendered conductive when the trigger capacitor 21 is charged to a desired level. When the secondary winding T2a does not have continuity to ground through the transistor 19c, the oscillator 17 cannot operate.

It will be recalled that the circuit 19 includes a comparator circuit 19b which compares the voltage of a reference voltage source 19a with the voltage to which the triggering capacitor 21 is charged (which is desirably 300 volts in the exemplary circuit being described). In FIG. 4, the conductor W1 extending from the trigger capacitor 21 is shown coupled through a resistor 56 to a neon lamp 58, in turn, coupled through a capacitor 60 to ground. The neon lamp 58, for example, may provide a voltage drop of 240 volts. The voltage at the side of the neon tube adjacent to capacitor 60 is coupled to the inverting input 62a of an operational amplifier comparator circuit 62. The non-inverting input 62b of the circuit 62 is coupled to the cathode of a forwardly conducting rectifier 19a acting as a reference 0.7 voltage source. The cathode of the rectifier 19a is grounded. As shown in FIG. 4, the anode of the rectifier 19a is coupled through a resistor 66 to the output 62c of the comparator circuit 62 and through a resistor 68 to the plus VF terminal of the DC power supply. A resistor 70 is connected between the output 62c of the comparator circuit 62 to the base of transistor 19c.

Normally, the output of the comparator circuit 62 will be at ground potential because the voltage at the non-inverting input 62a of the comparator circuit is above the 0.7 voltage reference fed to the noninverting input 62a. When the negative voltage on the capacitor 21 rises to about −330 volts, the various voltage drops appearing in the circuit including line W1, resistor 56, neon lamp 58 and resistor 64 will be such that the voltage on the inverting input 62a will drop below +0.7 volts, causing the output of the comparator circuit to switch to a positive voltage. This positive voltage is coupled through resistor 70 to the base of the transistor 19c to cause the same to conduct. This grounds the base of the oscillator transistor 59 to cause the oscillator to become inoperative. In this manner, the voltages to which the capacitor 21, as well as the other capacitors of the flash lamp control circuits 19A and 19B charge is set to desired values.

When the trigger capacitor 21 is charged, the voltage at the bottom terminal of neon lamp 58 is a low negative voltage, to which a capacitor 60 coupled between this terminal and ground is charged. This negative voltage is coupled by a conductor W4 to the reset inputs of each flip-flop circuit 53 to keep the same reset.

When the trigger capacitor 21 discharges to initiate a range determining flash operation in a manner to be described, the voltage on conductor W1 extending from this negatively charged capacitor will suddenly change in a positive direction towards ground potential. The effect of this positive going voltage, delayed somewhat by capacitor 60 coupled between the neon lamp 58 and ground and coupled by conductor W4 to the inputs 62b of the flip-flop circuits 53, is to remove the reset voltage therefrom to permit these flip-flop circuits to be set. The purpose of the short delay introduced by capacitor 60 is to avoid setting of the flip-flop circuits by noise signals induced into the circuitry as the capacitors discharge and energize the flash lamp 5b.

Refer now to the range flash control circuit 19B in FIG. 4. As previously indicated, a relatively small capacitor 20 (for example a capacitor of about 10 microfarads) is coupled between the flash lamp terminal 5b' and 5b''. The triggering capacitor 21 of this circuit is coupled between the ungrounded end of the primary winding T1' of the trigger transformer T1 and a resistor 72 extending to the negative bus B. As previously indicated, triggering capacitor 21 becomes discharged when the wiper contact 26' contacts the first segment 26-0 of the switch 26 (FIG. 3). With the generation of a trigger pulse by the discharge of the capacitor 21 through the primary winding T1', the capacitor 20 will discharge through the flash lamp to generate a flash of light of a magnitude only sufficient for ranging purposes (which is generally inadequate for exposure purposes to save battery power). The flash lamp 5b, however, is substantially energized for exposure purposes by means of the exposure flash control circuit 19A now to be described.

The circuit 19A includes a larger capacitor 20' (for example, 180 microfarads) connected between the negative bus B and a parallel circuit comprising branch including an SCR device 82 connected to ground and another branch including a rectifier 77 in series with a resistor 78 and the flash on-off switch 8', in turn, connected through a rectifier 80 to ground. The rectifiers 77 and 80 are oriented so that the capacitor 20' will charge therethrough to the negative voltage on the bus B less the voltage drop across the resistor 78 and the rectifiers 77 and 80. The SCR device 82 is oriented so that the capacitor 20' will discharge through the anode-cathode circuit of the SCR device 82 when the SCR device is triggered by the closure of the conventional synch switch 76 which is closed by the camera when the shutter is moved to a lens opening position. The control terminal 82a of the SCR device is shown connected to the juncture between the rectifier 80 and the flash on-off switch 8'. It is thus apparent that the SCR device 82 cannot be fired when the flash on-off switch is in its "off" condition. The rectifiers 77 and 80 are oriented in a direction which prevents the discharge of the capacitor 20'.

The trigger capacitor 21' of the flash exposure circuit 19A is shown connected between the anode of the rectifier 74 and the ungrounded end of the primary winding T1' of the trigger transformer T1. When the synch switch 76 is closed with the flash on-off switch in an "on" position, the trigger capacitor 21' discharges through a circuit including the primary winding T1' of the trigger transformer T1, the synch switch 76, the on-off switch 8' and the grounded rectifier 80. A ringing voltage is produced by the sudden discharge of the trigger capacitor 21' which is, in turn, coupled to the control terminal 82a of the SCR device 82, immediately to fire the same and enable the capacitor 20' to discharge through the SCR device 82 and the flash lamp terminal 5b to generate a flash of light.

It should be noted that flash lamp energizing circuits and the range determining energizing circuit are not simultaneously connected to the battery at the same time, so that a sufficient output of the battery is obtained during the more sensitive range determining measuring operations. Also, by providing a circuit which disables the high voltage oscillator when the capacitors are adequately charged prior to the depression of the shutter release button, the battery drain is further minimized. Also, by de-energizing the high voltage oscillator during a range measuring operation, interference with the proper operation of the range measuring circuits of the high voltage oscillator is eliminated.

It is apparent that the present invention as described is a highly reliable, relatively inexpensive range determining circuit which is especially useful in an automatic focus control and/or automatic flash exposure control camera. Also, the design of the circuit is such as to effect a minimum drain on the battery. It should be understood that numerous modifications may be made in the most preferred forms of the invention described without deviating from the broader aspects of the invention.

I claim:

1. In an automatic focussing camera including a housing having front wall means with a focussing lens unit which is movable from an initial starting position in a given direction over a range of positions where the camera is focussed for object distances falling in progressively varying range zones, a shutter release control which when fully operated first effects movement of said lens unit from said starting position in said given direction and then effects movement of the camera shutter to a lens opening position where light passes through the lens unit onto the film plane, resetting means for advancing the film in the camera, cocking the camera shutter and returning said lens unit to said starting position after a picture is taken; flash lamp means on said camera oriented to direct its light forwardly of said camera housing to be reflected from an object to be photographed; and flash lamp energizing circuit means responsive to the movement of said shutter release control for first triggering and energizing said flash lamp means; reflected light-receiving means in said housing for receiving object reflected flash lamp light; the improvement comprising a single light sensor for sensing the light passing through said light-receiving means; at least two signal level detectors each responsive to a different peak level of a reflected flash lamp light profile sensed by said single sensor following the generation of a range determining flash of light and indicating an object distance falling within a different range zone by being triggered into a given state; scanning means following the movement of said lens unit from said starting position for sequentially scanning the state of the signal level detectors set to be triggered by the reflected flash lamp light profile indicating a range zone corresponding to the focussing range of the lens unit at the time involved; and means for stopping the lens unit when a signal level detector is scanned which is triggered into a given state indicating a detected peak light level corresponding to an object range falling within the range zone in which the lens unit is focussed at the time involved.

2. The camera of claim 1 wherein said camera is provided with exposure light varying means for varying the amount of object reflected flash lamp light which passes through said lens unit onto the film plane when a flash exposure operation of the camera is desired, and said object range responsive control means controlling said exposure light varying means.

3. The camera of claim 1 wherein said camera is provided with electrical exposure control means to adjust the amount of light passing through said lens unit which reaches the film plane, said electrical exposure control means being responsive to the amount of light sensed by said light sensor which also controls the triggering of said one or more signal level detectors, but following the receipt of the object reflected flash lamp light used for range determination purposes.

4. The camera of claim 1 wherein said flash lamp energizing circuit includes means responsive to the operation of said shutter release control by triggering and energizing said flash lamp means to produce a film exposure enhancing flash of light following said first triggering and energizing thereof when the shutter is moved to said lens opening position.

5. The camera of claim 1 wherein said flash lamp energizing circuit includes means responsive to the operation of said shutter release control by triggering and energizing said flash lamp means to produce a film exposure enhancing flash of light following said first triggering and energizing thereof when the shutter is moved to said lens opening position, said flash lamp means which provides said range determining and film exposure light is the same flash lamp which generates both visible and infrared wavelengths, and there is provided an infrared filter in the light path to said light sensor which filters out most of the visible light wavelengths leaving mostly the infrared wavelengths.

6. The camera of claim 1 wherein the lens unit is movable from an initial starting nearest range focussed position in a given direction over a range of positions where the camera is focussed for object distances falling in progressively increasing range zones so that the scanning means scans the signal level detectors in an order inverse to the range zone distances involved, and said means for stopping the lens unit being operative to do so when a signal level detector is first scanned in said triggered given state.

7. The camera of claim 6 wherein said scanning means includes switch means comprising a movable contact and a number of stationary contacts with which said movable contact makes sequential contact, said movable contact when released from an initial starting position sequentially moving in a given direction for engaging the stationary contacts in the order of the contacts associated with signal level detectors set to be triggered by reflected flash lamp light profile signals indicating progressively increasing range zones; and there being provided means responsive to the operation of said resetting means which cocks the shutter for also returning said movable contact to said initial starting position; and means responsive to the operation of said shutter release control for moving said movable contact in said given direction.

8. The camera of claim 7 wherein said movable contact is ganged for movement with said lens unit.

9. The camera of claim 8 wherein there is associated with said movable contact and lens unit spring loaded drive means for driving the same; latching means responsive to said resetting means for latching said movable contact and lens unit in said starting positions thereof against the spring force of said drive means; and release means responsive to operation of said shutter release control for releasing said movable contact and lens unit from said latching means so that said drive means imparts motion thereto.

10. The camera of claim 9 wherein said stopping means includes a solenoid, a solenoid operated spring urged lever having a pawl and held in a given position against the force of the spring when the solenoid is energized, means following each operation of said shutter release control for energizing the solenoid until said movable contact engages one of said stationary contacts associated with a triggered signal level detector, the solenoid then becoming de-energized, toothed means ganged for movement with said movable contact and lens unit and having teeth movable into the path of movement of the pawl of said solenoid lever when released by the solenoid and is otherwise not latched into place, said release means initially latching said solenoid lever in a position where said pawl thereof is out of the path of movement of said toothed means.

11. The camera of claim 7 wherein there is a last stationary contact beyond the stationary contact associated with the signal level detector associated with the next to the furtherest range zone involved, said last stationary contact being connected to a signal source which duplicates the signal produced by the output of a triggered signal level detector, so that there are n−1 signal level detectors where n is the number of range zones provided the farthest range zone extending to infinity.

12. In a still camera including a housing having a shutter release control which, when fully operated, after an initial interval effects movement of the camera shutter to a lens opening position where light passes through the lens unit onto the film plane; resetting means for advancing the film in the camera and cocking the camera shutter; flash lamp means on said camera for directing light forwardly of said camera to be reflected from an object to be photographed; a DC voltage operated flash energizing circuit responsive to the operation of said shutter release control for triggering and energizing said flash lamp means during said initial interval to produce a range determining flash of light; a reflected light-receiving means in said housing for receiving object reflected flash lamp light; a light sensor for sensing light passing through said light-receiving means; DC voltage operated electrical range determining means responsive to the output of said light sensor prior to the movement of said shutter to said lens opening position for controlling an object range dependent variable camera parameter; and a pair of battery terminals to which a DC battery is to be connected, and from which said flash energizing circuit and range determining means are to be energized, the improvement wherein at least a portion of said range determining means requires substantial DC current and is initially disconnected from said battery terminals, and there is provided means for coupling said battery terminals to said flash lamp energizing circuit to energize the same so that operation of said shutter release control will trigger and energize said flash lamp means, and switching means following the operation of said shutter release control and the energization of said flash energizing circuit for momentarily connecting said battery terminals to said portion of said electrical range determining means to energize the same.

13. The camera of claim 12 wherein there is provided a main power on-off switch in series with said terminals so that there is no drain on the battery when use of the camera is not desired.

14. In a still camera including a housing having a shutter release control which, when fully operated, after an initial interval effects movement of the camera shutter to a lens opening position where light passes through the lens unit onto the film plane; resetting means for advancing the film in the camera and cocking the camera shutter; flash lamp means on said camera for directing light forwardly of said camera to be reflected from an object to be photographed; a DC operated flash energizing circuit responsive to the operation of said shutter release control for triggering and energizing said flash lamp means during said initial interval to produce a range determining flash of light, said flash energizing circuit including an oscillator, rectifier means coupled to the output of the high voltage oscillator for producing a DC voltage therefrom, capacitor means charged through said rectifier means which capacitor means effects triggering and energizing of the flash lamp means upon initial operation of said manually operable shutter release control, a reflected light-receiving means in said housing for receiving object reflected flash lamp light; a light sensor for sensing light passing through said light-receiving means; DC voltage operated electrical range determining means responsive to the output of said light sensor prior to the movement of said shutter to said lens opening position for controlling an object range dependent variable camera parameter; a pair of battery terminals to which a DC battery is to be connected and from which said flash energizing circuit and range determining means are to be energized; means for coupling said battery terminals to said flash lamp energizing circuit to energize the same so that operation of said shutter release control will trigger and energize said flash lamp means; the improvement comprising: switching means following the operation of said shutter release control for terminating the possible operation of said oscillator prior to the operation of said electrical range determining means so that the oscillator does not cause interfering signals which could adversely effect the operation of the range determining means.

15. The camera of claim 14 wherein there is provided means responsive to the adequate charging of the capacitor means for disabling the operation of the oscillator.

* * * * *